(12) United States Patent
La Rosa et al.

(10) Patent No.: US 8,459,554 B2
(45) Date of Patent: Jun. 11, 2013

(54) LARGE AREA MONITORING DEVICE

(75) Inventors: Manuela La Rosa, Giarre (IT); Davide Giuseppe Patti, Mascalucia (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 0 days.

(21) Appl. No.: 13/240,606

(22) Filed: Sep. 22, 2011

(65) Prior Publication Data

US 2012/0132711 A1 May 31, 2012

(30) Foreign Application Priority Data

Nov. 30, 2010 (IT) .............................. VA2010A0090

(51) Int. Cl.
*G06K 7/00* (2006.01)
(52) U.S. Cl.
USPC .......................................................... 235/440
(58) Field of Classification Search
USPC ......................................... 235/440; 600/476
See application file for complete search history.

(56) References Cited

U.S. PATENT DOCUMENTS

| | | | |
|---|---|---|---|
| 4,816,665 A * | 3/1989 | Ksu ............................. | 250/201.5 |
| 2003/0016849 A1* | 1/2003 | Andrade ....................... | 382/124 |
| 2004/0079144 A1* | 4/2004 | Newman et al. ................ | 73/146 |
| 2009/0033467 A1 | 2/2009 | Finocchiaro et al. ......... | 340/10.1 |
| 2010/0148164 A1 | 6/2010 | La Rosa et al. ................ | 257/40 |
| 2010/0231407 A1 | 9/2010 | Carr ............................. | 340/691.1 |
| 2010/0236598 A1 | 9/2010 | Roy et al. ...................... | 136/244 |
| 2011/0211316 A1 | 9/2011 | La Rosa ........................ | 361/750 |
| 2012/0190989 A1* | 7/2012 | Kaiser et al. .................. | 600/476 |

* cited by examiner

*Primary Examiner* — Daniel Hess
(74) *Attorney, Agent, or Firm* — Allen, Dyer, Doppelt, Milbrath & Gilchrist, P.A.

(57) ABSTRACT

A monitoring device may include a core cell including a detection circuit, and a radio frequency (RF) tag antenna configured to exchange data with a data acquisition reader device, and a single-tier corolla having sensor cells around the core cell and covering a monitoring area. The sensor cells may be configured to convert a change of a parameter at the cell location. The detection circuit may be configured to detect a change in the parameter and location based upon excitation by the reader device.

26 Claims, 5 Drawing Sheets

MECHANICAL STRESS

MECHANICAL STRESS

LARGE AREA MONITORING DEVICE

FIELD OF THE INVENTION

The present disclosure relates generally to the monitoring of physical, chemical, and/or geometrical parameters over large structures.

BACKGROUND OF THE INVENTION

Patent application No. VA2010A000018, filed on Feb. 26, 2010, assigned to the present application's assignee, discloses a multi-cell flexible sheet that includes organic polymer constitution, variable length, and a monolithic fabricated array of one or more types of cells of same or different functionalities (e.g. sensor cells, active pixel cells of a large size display), juxtaposed among them to provide a multi-cell sheet to be supported on a flexible film. This two-dimensional "tablecloth" array of consistent integrated circuit cells could be cut in pieces of tailored size for the need of the specific application without impairing the operability of all the cells spared by the cutting while eventually serving as a set of individually severable cells of autonomous operability. The multi-cell flexible sheet may be useful for applications requiring a generally large area "pixel-like" array of independently functioning cells, each having an energy storage element for powering the functional circuits of the cell and an optoelectronic device for communicating with the external world.

Conductive boundary strips among the cells may provide electrical paths of common supply rails and/or of input/output nodes of the cells. The consistency of each individual cell follows the typical approach of a pixel type organization and may be burdensome, especially for sensing events that may occur at any location over a relatively large surface of a structure or body to be monitored. Communication with the external board through optoelectronic devices as disclosed by the above cited patent application may limit its usefulness to applications where it is possible to optically read the cells. Moreover, incorporation of a battery or other energy storing device in each individual cell may be another burdensome aspect.

SUMMARY OF THE INVENTION

An architecture may provide an approach to the above discussed drawbacks of prior systems by devising consistent monitoring devices (modules) that are replicable over a continuous flexible substrate, preferably of organic polymeric constitution. The substrate may be eventually supported on a flexible ribbon that may be a textile fabric or a fiber-reinforced plastic film, substantially in a two-dimensional extending tablecloth-like array of identical or different devices (modules), each covering a relatively extended surface area of a monitored structure or body.

Each consistent monitoring device comprises a core cell including a monolithic integrated circuit and RF coupling tag means or an RF tag circuit including a tag antenna, integrated or formed onto the IC chip by post processing. The RF tag circuit is configured to make wirelessly identifiable and excitable the single module among the neighboring modules of the tablecloth array, and to exchange data with a reader device via a far-field or near-field electromagnetic coupling with an antenna of the reader device or via a far-field or near-field multiple electromagnetic or magnetic couplings. This may be accomplished, for example, through concatenated electromagnetic expansions, in a substantially wireless manner with neighbor modules, or alternatively even with a wire connection to access terminals or pads arranged along one or more perimeter sides of the two-dimensional extended tablecloth array of self-consistent surface monitoring modules.

The core cell may be energized by rectifying a suitably concentrated RF electromagnetic energy transferred by the reader device upon coupling with the core cell to acquire data sensed by its corolla (array arranged similarly to the pedals of a flower) sensor cells or alternatively, have an embedded energy source in the form of a micro-battery or of a photovoltaic generation device eventually associated to a an embedded storage element, as disclosed in the already cited prior patent application No. VA2010A000018. The monolithic integrated circuitry of each core cell includes at least a resonance capacitor, a modulator, a rectifier circuit, a charge-pump circuit, a detection circuit and analog and logic signal processing circuits.

Each consistent monitoring device or module has at least one single tier corolla of identical or different sensor cells around said core cell, covering a substantially enlarged area of the surface of a monitored structure or body onto which the multi-cellular monitoring device is applied that is a multiple of the individual surface area of a single sensor cell of the corolla. Each sensor cell may be adapted to convert a change of a geometrical, physical or chemical parameter or state at its location over the surface of the monitored structure or body, and any such change and location of occurrence is detected/recognized by the detection and signal processing circuit of the core cell, upon being RF excited by said reader device.

This approach may contemplate "monolithic" replicable units (monitoring devices) including a geometrically ordered plurality of identical or different sensors cells that thus cover a proportionately extended area of the surface of the structure or body to be monitored. This provides for the detection of parameter changes and their location of occurrence over the covered area of the singly readable unit. This, besides making a so composed monolithic unit (severed from tablecloth array magazine ribbon) usable per se to gather information on events and locations of occurrence over an extended area, may make the monitoring of vast surfaces significantly less burdensome by reducing the number of data acquisition nodes.

The details of the article of manufacture of the present disclosure will now be highlighted in the following description of exemplary embodiments, making reference to the attached drawings, which is not to be intended as limiting the scope of the claimed invention to the examples, herein below illustrated for an easier comprehension of the invention.

DETAILED DESCRIPTION OF THE PREFERRED. EMBODIMENTS

Figure 1:
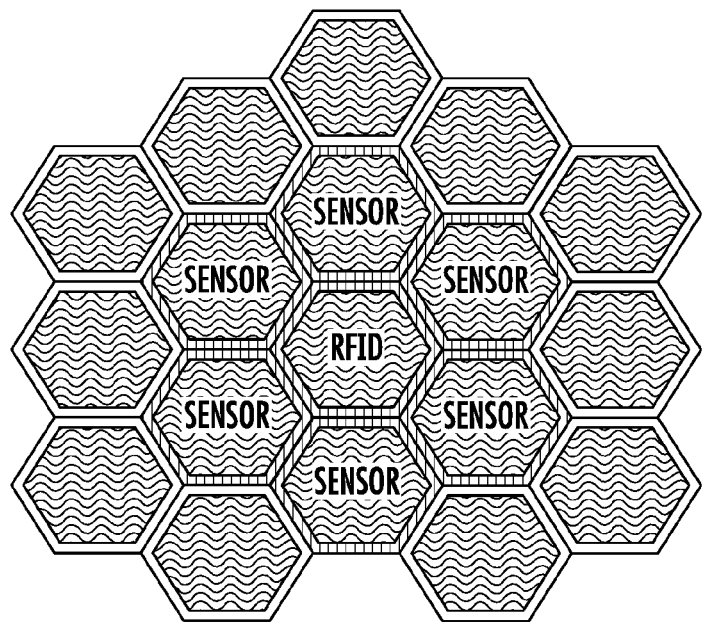
FIG. 1 is a layout of a consistent monitoring device, according to the present invention.

FIG. 1 is an exemplary highlighted layout of an elementary self-consistent monitoring device (module). The device is in a two-dimensional tablecloth array having a substantially flexible all-organic multilayer polymer monolithic base in which the functional circuits of the device are integrated. This is eventually embedded also with silicon-base integrated circuit chips functionally connected to the organic integrated circuit. Materials and fabrication technologies may be those described in prior Italian patent applications Nos. VA2008A000062 and VA2010A000018, assigned to the present application's assignee, the contents of these applications are hereby incorporated by reference in their entirety.

The shape of the core cell RFID and of the corolla cells SENSOR may be of any geometric shape: polygonal, disc-like, oblong, etc. Cell shapes and arrangements that permit to a close packing together of the sensing areas of the SENSOR cells and of these with the central core cell RFID are preferable.

The size of the cells and of the unitary monitoring device (RFID+SENSORS) may be as small as allowed by the definition limits of the printing techniques used in the integration process. If a fine granularity of surface sensing points is important for the intended surface monitoring application or as large as desirable for applications, then an extended coverage of relatively vast surfaces may be a requisite. Organic base cells may have sizes in the order of several centimeters; therefore, a single replicable unitary monitoring device may cover an area of the surface of the monitored structure or body that may reach several decimeters square, within which the device is able to provide information on parameter changes and the locations within the covered area where the events take place.

Optionally, each cell may share in common, with other cells or at least with cells of the same type, at least a conducting layer of constituting an electrical supply distribution rail or an input/output of the integrated circuit of the cells, allowing cells to function in parallel. The corolla sensing cells SENSOR may be structural sensors, corrosion sensors, accelerometers, inclinometers, moisture sensors, strain/crack gauges and others. They may be passive, as certain structural sensors and inclinometers, strain/crack gauges, variable resistors, variable capacitors, or they may include active circuits, in which case the core RFID cell normally provides the required power supply to the active circuital components of the sensor cell circuit.

Figure 2:
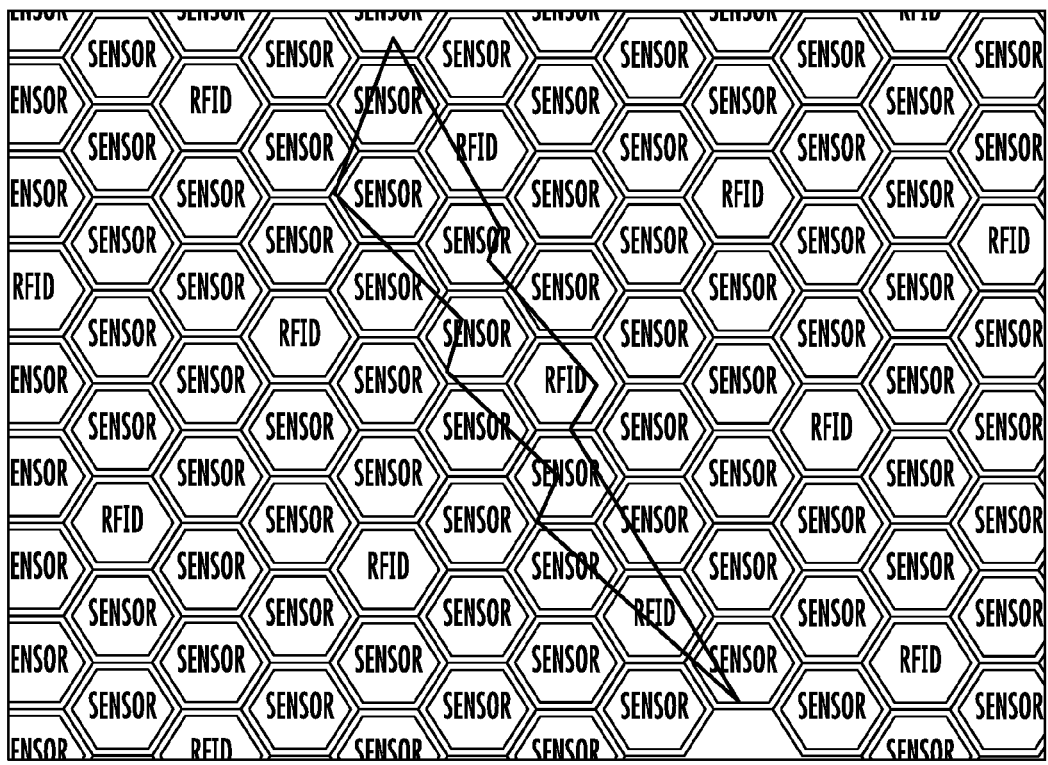
FIG. 2 shows a possible event of localized stress over a surface sensed by a plurality of sensor cells belonging to the multi-cellular corollas of adjacently replicated monitoring devices of a two-dimensional tablecloth array of surface monitoring devices, according to the present invention.
Figure 3:
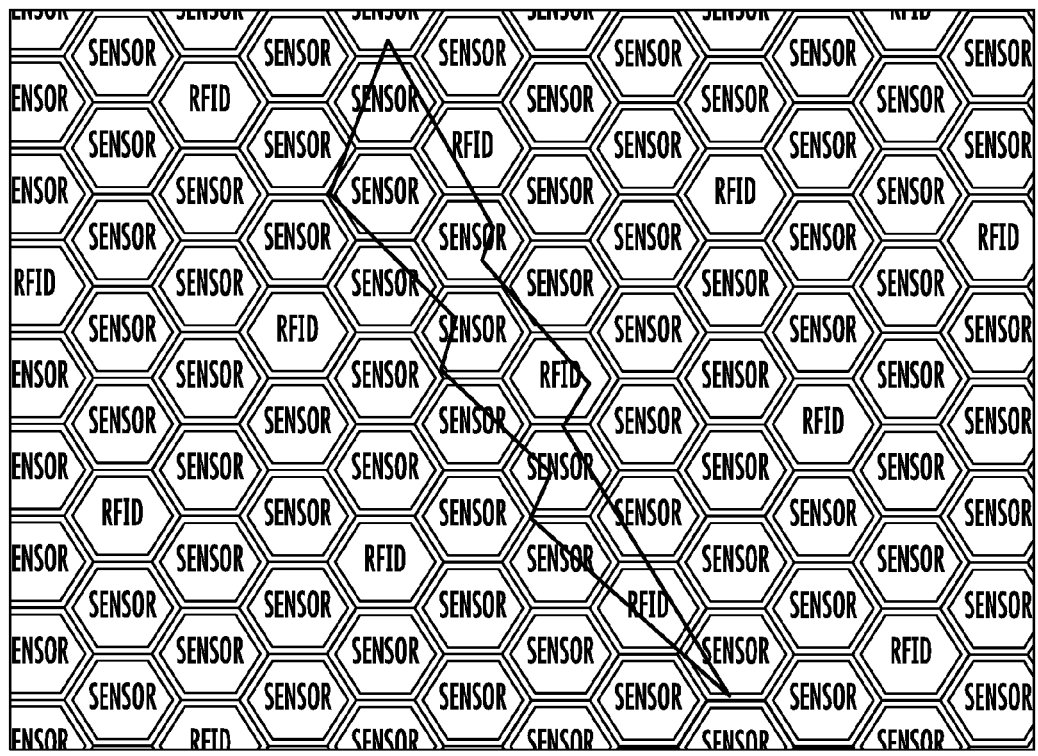
FIG. 3 is a map of the highlighted sensor cells that are subjected to a change in their original electrically readable value consequent to the straining effect of the localized stress, according to the present invention.

FIG. 2 shows a possible mechanical stress affecting a localized portion of the monitored structure, the effects of which are sensed by a plurality of sensor cells belonging to the multi-cellular corollas of adjacently replicated monitoring devices of a two-dimensional tablecloth array of surface monitoring devices of this disclosure. FIG. 3 is a map of highlighted sensor cells that are subjected to a change in their original electrically readable value, for example, an integrated resistor subject to change value (e.g. increasing its resistance if stretched) because of the straining effect of the localized stress. The change of resistance of the affected sensor cells (the highlighted SENSOR cells) is detected by the respective core cells RFID, to which the affected sensor cells pertain. These changes are read by a RFID surface reader device by scanning the monitored surface of the structure covered by the surface monitoring tablecloth device and provide a map of the detected local stresses born by the monitored structure.

Figure 4:
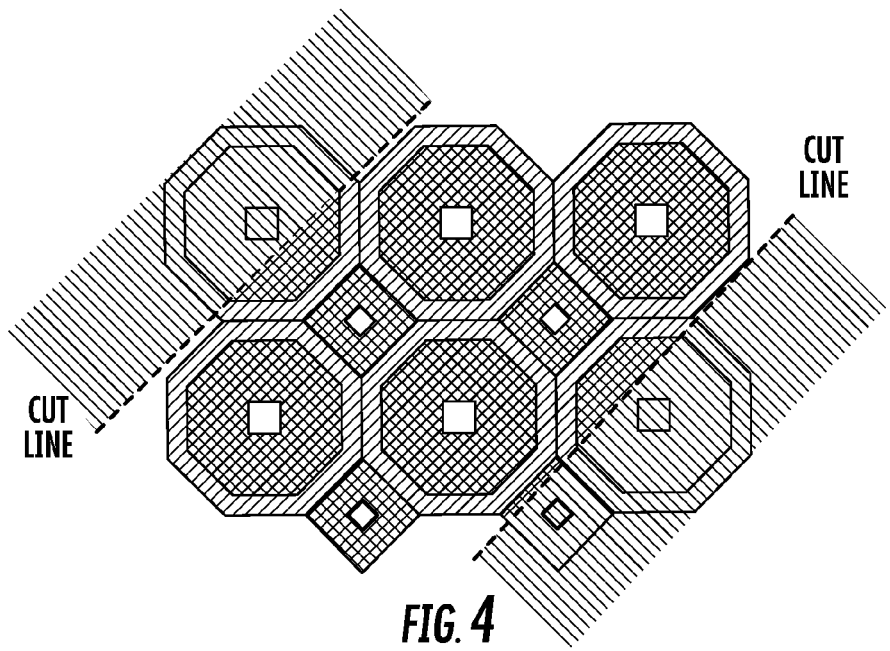
FIG. 4 shows possible severing lines of a piece of the multi-device sheet and the devices that would be lost, according to the present invention.

FIG. 4 shows possible severing (cut) lines of a piece or strip of the monolithic fabricated ribbon of table cloth array of consistent monitoring modules that, as depicted in FIG. 4, may also have different shapes and sizes. Of course, there will be individual modules that will be destroyed by cutting them through and the devices that would be lost are highlighted in the layout view.

Figure 5:
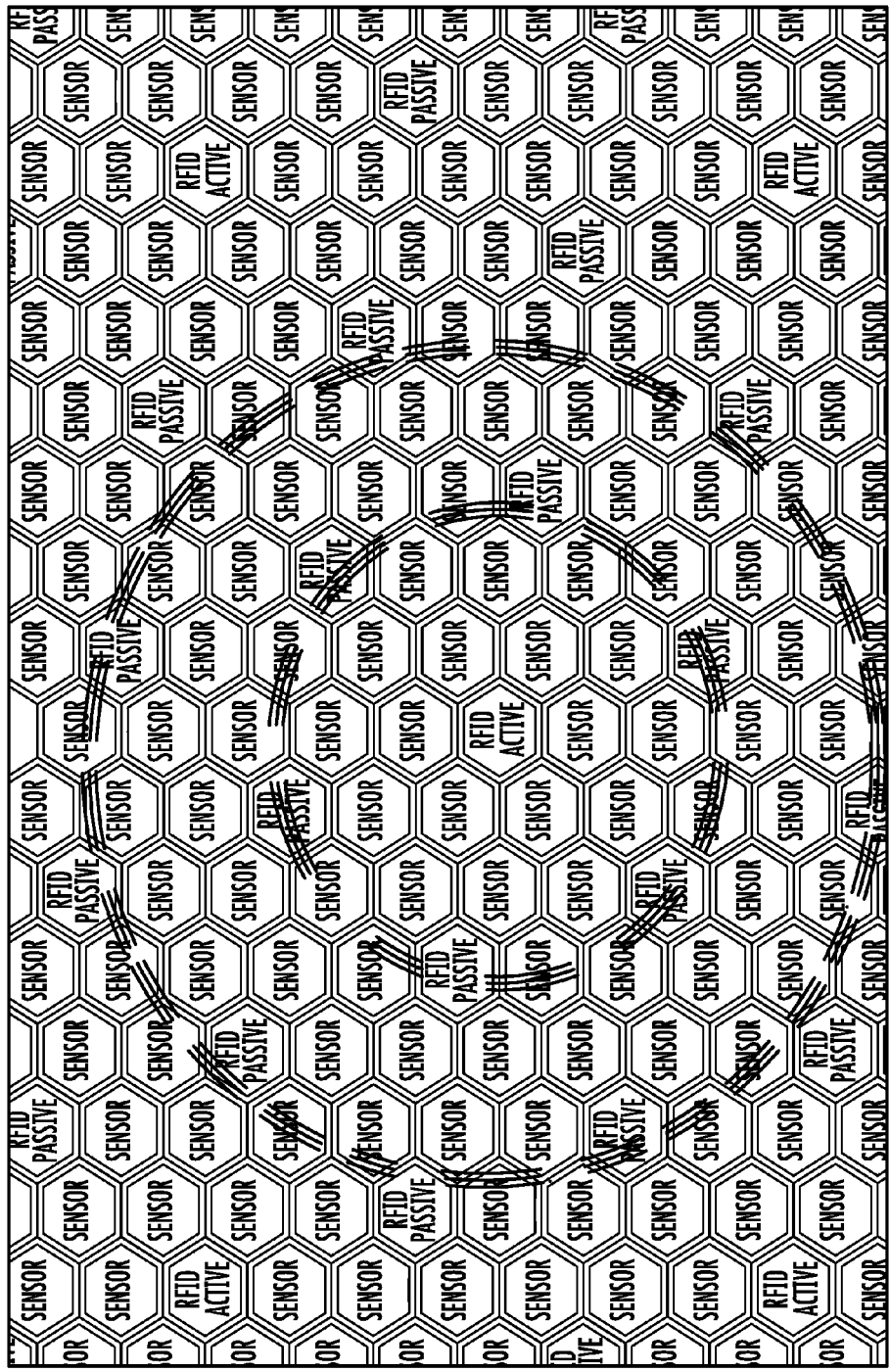
FIG. 5 illustrates a scheme of a distributed multi-RFID module surface sensing array, according to the present invention.

Overall burdens of the surface monitoring structure may be reduced by implementing more efficient access schemes to the sensed information. FIG. 5 is a layout view that illustrates a possible hierarchical architecture for surface data acquisition, according to which the number of RFID core cells to be accessed by an external reader device used for acquiring the data, highlighted in the layout view of FIG. 5 and labeled "active," may be greatly reduced. According to such an embodiment, the active RFID core cells are eventually RF excited individually in a far-field mode by an external reader hovering or run over the surface sensing sheath for acquiring data not solely pertaining to the corolla sensor cells of the excited RFID core cell, but also to the corolla sensor cells pertaining to neighboring modules. The core cells of neighboring modules, denominated RFID "passive", have a multi-bit storage resource embedded in their sensing circuitry and have a short-range, near-field RFID excitable tag antenna means or an tag antenna circuit adapted to communicate via electromagnetic or magnetic coupling with a dedicated short-range antenna of the active RFID core cell of the multi-module cluster for reading the data stored in the other modules of the cluster, making them acquirable by the far-field RF coupled external data acquisition reader device.

For example, transmission and acquisition of data sensed over an enlarged portion of a monitored surface through a centralization in a data acquisition point for a cluster of several multi-sensor surface monitoring devices (modules) may be implemented by implementing in the active RFID core cells and in neighboring passive RFID core cells composing an externally readable cluster, multi branch near-field RF antenna cascades as those described in prior published patent application U.S. Patent Application Publication No. 2009/0033467 to Finocchiaro et al., also assigned to the present application's assignee, which corresponds to patent application No. VA2010A000089, filed on Nov. 30, 2010, these applications are hereby incorporated by reference in their entirety.

Figure 6:
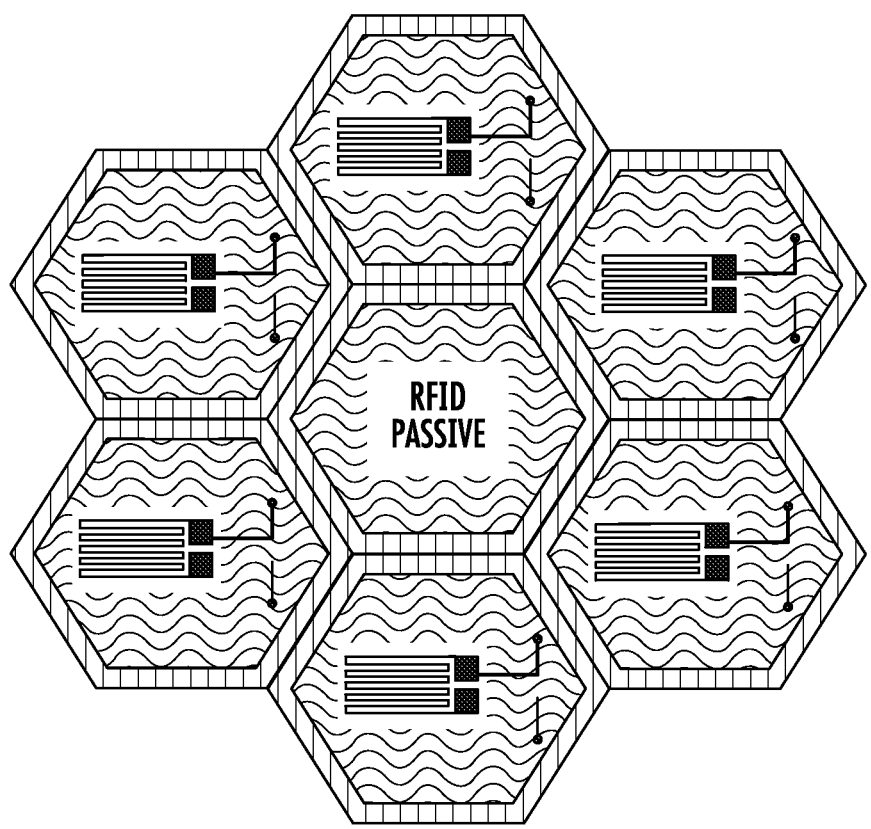
FIG. 6 is a layout of an elementary surface monitoring device (module) wherein all the sensor cells of the corolla around the core cell are strain gauges for mapping mechanical stress over the sensed surface area, according to the present invention.
Figure 7:
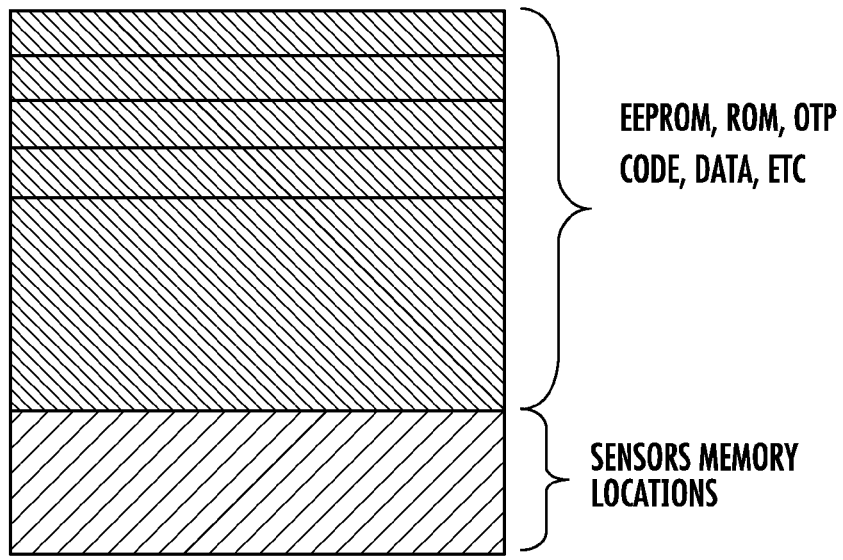
FIG. 7 is a graphical representation of the memory map adapted to store bits according to an access architecture of FIG. 5.

FIG. 6 shows a possible embodiment of an RFID passive monitoring device or module, wherein the corolla sensor cells are, for example, indicated as being integrated strain gauge sensors. Accordingly, the embedded storage means or storage circuit of the passive RFID core cell may have a memory map organized as depicted in FIG. 7, with dedicated sensor memory locations. Here, the information-bearing content of each memory bit (a strain gauge sensor cell) may be determined, according to predefined thresholds that for the contemplated example of FIG. 6, and would be resistance values a resistor assumes when subject to stretching. Alternatively, the sensor could be a thermal resistor or any other parameter sensing device.

Figure 8:
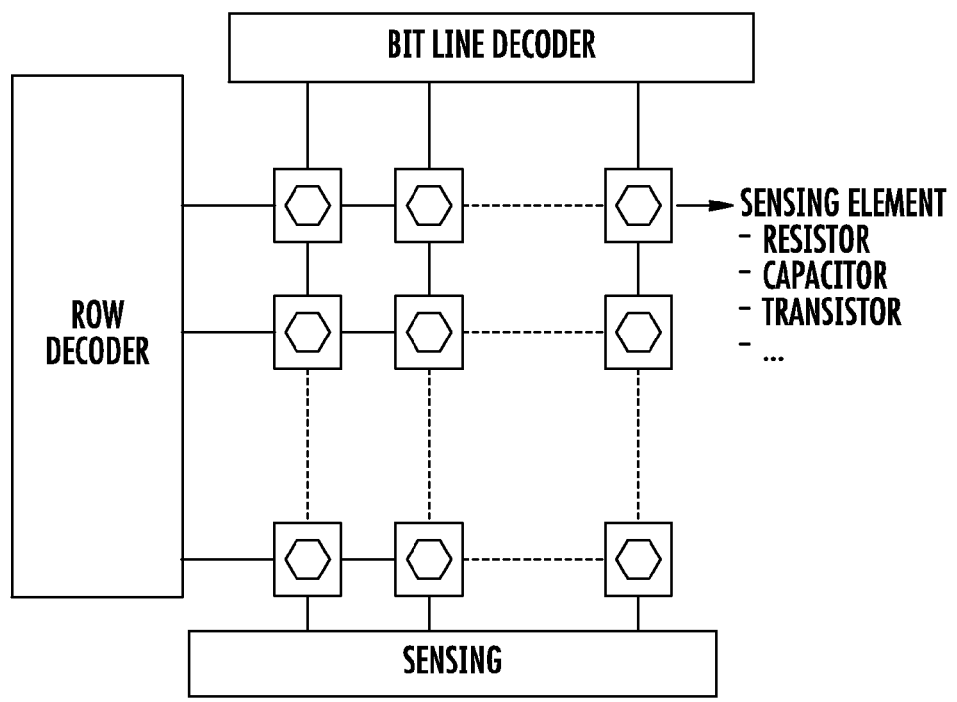
FIG. 8 is an alternative memory architecture of an RFID surface sensor array, according to the present invention.

The sensor memory of an RFID core cell may be programmed, after manufacturing, by exposing the sensing element to a certain magnitude of the monitored parameter. The programming process may be irreversible or even reversible and the memory locations may be one-time programmable or rewritable. The sensor memory access architecture may have a typical scheme as illustrated in FIG. 8.

Large surface monitoring systems according to the present disclosure offer unique features of configurability to needs. In view of its tablecloth ribbon form, the system may be fabricated, maintaining flexibility and pliability to perfectly conform to the surface to be monitored, with outstanding sturdiness because its fabric is supported substantially by organic polymeric substrate that is integrated and includes silicon based ICs of specific functional circuitry of relatively complex signal processing and data storage, which are interconnected with ancillary and/or peripheral organic polymer based circuitry. Contemplated fields of application may include buildings, bridges, big infrastructures monitoring (Structural Health Monitoring), airplane structural monitoring, gas and oil tanks and tankers crack monitoring, large area pollution monitoring, passenger collision detection systems, smart passenger compartment surfaces in automotive environment, works of art, and monuments aging monitoring.

That which is claimed is:

1. A monitoring device comprising:
at least one single-tier sensor array comprising
a core cell comprising a detection circuit and a radio frequency (RF) tag antenna coupled thereto and configured to communicate data with a reader device,
a plurality of sensor cells around said core cell and covering a monitoring area, each sensor cell configured to sense a parameter at a respective cell location, and
a monolithic integrated circuit (IC) comprising a circuit associated with said core cell and said plurality of sensor cells,
said core cell configured to wirelessly communicate with respective core cells of adjacent monitoring devices;
said detection circuit configured to detect the parameter and the respective sensor location based upon excitation by the reader device.

2. The monitoring device of claim 1 wherein said at least one single-tier sensor array comprises a flexible layer supporting said core cell and said plurality of sensor cells.

3. The monitoring device of claim 2 wherein said flexible layer comprises a cloth layer.

4. The monitoring device of claim 2 wherein said flexible layer comprises a plastic layer.

5. The monitoring device of claim 1 wherein said monolithic IC includes at least one of a resonance capacitor, a modulator, a rectifier circuit, a charge-pump circuit, a detection circuit, and a signal processing circuit.

6. The monitoring device of claim 5 wherein said at least one single-tier sensor array comprises a plurality of electrically conductive rails configured to be common to said plurality of sensor cells; and wherein said plurality of sensor cells includes active devices powered by said charge-pump circuit of said core cell via said plurality of electrically conductive rails.

7. The monitoring device of claim 1 wherein said plurality of sensor cells includes active devices powered via near-field coupling of each sensor cell with said core cell.

8. The monitoring device of claim 1 wherein said core cell includes an energy source.

9. The monitoring device of claim 8 wherein said energy source comprises at least one of a battery and a photovoltaic generator.

10. The monitoring device of claim 1 wherein said core cell comprises an electromagnetic field identifiable and excitable core cell.

11. The monitoring device of claim 1 wherein said plurality of sensor cells comprises identical sensor cells.

12. The monitoring device of claim 1 wherein said plurality of sensor cells comprises different sensor cells.

13. The monitoring device of claim 1 wherein the parameter comprises at least one of a geometrical parameter, a physical parameter, and a chemical parameter.

14. A monitoring device comprising:
at least one sensor array comprising
a core cell comprising a detection circuit, and a radio frequency (RF) tag antenna coupled thereto and configured to communicate with a reader device, and
a plurality of sensor cells around said core cell and covering a monitoring area, each sensor cell configured to sense a parameter at a respective cell location,
said detection circuit configured to detect the parameter and the respective sensor location,
said core cell configured to wirelessly communicate with respective core cells of adjacent monitoring devices.

15. The monitoring device of claim 14 wherein said detection circuit is configured to detect the parameter and the respective sensor location based upon excitation by the reader device.

16. The monitoring device of claim 14 wherein said at least one sensor array comprises a flexible layer supporting said core cell and said plurality of sensor cells.

17. The monitoring device of claim 16 wherein said flexible layer comprises at least one of a plastic layer and a cloth layer.

18. The monitoring device of claim 14 wherein said plurality of sensor cells includes active devices powered via near-field coupling of each sensor cell with said core cell.

19. A monitoring array comprising:
a plurality of monitoring devices, each monitoring device comprising at least one sensor array including
a core cell comprising a detection circuit, and a radio frequency (RF) tag antenna coupled thereto and configured to communicate with a reader device, and
a plurality of sensor cells around said core cell and covering a monitoring area, each sensor cell configured to sense a parameter at a respective cell location,
said detection circuit configured to detect the parameter and the respective sensor location;
said plurality of monitoring devices comprising at least one cluster of neighboring monitoring devices, each cluster comprising a control monitoring device, the core cells of other neighboring monitoring devices having a data storage, the RF tag antennas of the other neighboring monitoring devices configured to communicate with said RF tag antenna of said core cell of said control monitoring device;
said RF tag antenna of said control monitoring device configured to read sensed data stored in said data storage of each of said neighboring monitoring devices of the at least one cluster.

20. The monitoring array of claim 19 wherein said detection circuit is configured to detect the parameter and the respective sensor location based upon excitation by the reader device.

21. The monitoring array of claim 19 wherein each monitoring device further comprises a flexible layer supporting said core cell and said plurality of sensor cells.

22. The monitoring array of claim 21 wherein said flexible layer comprises at least one of a plastic layer and a cloth layer.

23. A method of making a monitoring device comprising:
forming at least one sensor array comprising a core cell comprising a detection circuit and a radio frequency (RF) tag antenna to communicate with a reader device, and a plurality of sensor cells around the core cell and covering a monitoring area, each sensor cell sensing a parameter at a respective cell location, the detection circuit detecting the parameter and the respective sensor location, the core cell to wirelessly communicate with respective core cells of adjacent monitoring devices.

24. The method of claim 23 wherein the detection circuit detects the parameter and the respective sensor location based upon excitation by the reader device.

25. The method of claim 23 further comprising forming a flexible layer supporting the core cell and the plurality of sensor cells.

26. The method of claim 25 wherein the flexible layer comprises at least one of a plastic layer and a cloth layer.

* * * * *